US00RE38555E1

(19) United States
(12) Reissued Patent
Braun et al.

(10) Patent Number: US RE38,555 E
(45) Date of Reissued Patent: Jul. 13, 2004

(54) CONTINUOUS CHAIN CASTER AND METHOD

(75) Inventors: Curt Braun, Prescott, AZ (US); Christopher A. Romanowski, Lake Arrowhead, CA (US); Bobby Bruce Speed, Murrieta, CA (US); Pieter F. Post, Rotterdam (NL)

(73) Assignees: Hunter Douglas Industries, B.V., Rotterdam (NL); Fata Hunter, Inc., Riverside, CA (US)

(21) Appl. No.: 09/962,741

(22) PCT Filed: Nov. 13, 1996

(86) PCT No.: PCT/US96/18492

§ 371 (c)(1),
(2), (4) Date: Oct. 5, 1998

(87) PCT Pub. No.: WO97/18049

PCT Pub. Date: May 22, 1997

Related U.S. Patent Documents

Reissue of:
(64) Patent No.: 5,979,538
Issued: Nov. 9, 1999
Appl. No.: 09/051,750
Filed: Nov. 13, 1996

U.S. Applications:
(60) Provisional application No. 60/006,689, filed on Nov. 14, 1995.

(51) Int. Cl.[7] ..... B22D 11/06
(52) U.S. Cl. ..... 164/479; 164/430; 164/431; 164/436; 164/481; 164/491
(58) Field of Search ..... 164/479, 481, 164/430, 432, 436, 491

(56) References Cited

U.S. PATENT DOCUMENTS 1,139,887 A 5/1915 Mellen
1,671,360 A 5/1928 Fletcher
2,631,343 A 3/1953 Hunter (List continued on next page.)

FOREIGN PATENT DOCUMENTS

| | | |
|---|---|---|
| JP | 55-133852 | * 10/1980 |
| JP | 58-90356 | 5/1983 |
| JP | 59-147750 | * 8/1984 |
| JP | 60-37248 | 2/1985 |
| JP | 62-207537 | 9/1987 |
| JP | 63-108946 | 5/1988 |
| JP | 63-108948 | 5/1988 |

*Primary Examiner*—Kuang Y. Lin
(74) *Attorney, Agent, or Firm*—Christie, Parker & Hale, LLP

(57) ABSTRACT

A continuous chain caster has upper and lower mold assemblies comprising endless belts and chains traveling at synchronized speeds. The mold assemblies meet to form a mold channel which is filled with molten metal from a headbox and feed tip. As the molten metal passes through the mold channel, the metal solidifies into the shape of the mold channel. Each belt is positioned outside the corresponding chain so that the smooth surface of the belt defines the surface of the mold channel thereby preventing the formation of fins between mold blocks which make up the chain, protecting the chain blocks, and neutralizing deformations in the chain blocks. The upper and lower blocks of the chains have protrusions at opposite ends which engage the opposing blocks to form the sides of the mold channel. By sliding the chains relative to each other, the width of the mold channel is adjustable. Further, the gauge of the mold channel is adjustable over the length of the channel by tilting one mold assembly relative to the other, so that the gauge at one end of the caster is greater than at the other end of the caster. In this embodiment, the protrusions are replaced with retractable legs which are held against the opposing block with a resilient member. The legs move in and out of slots in the blocks as the gauge of the channel mold is decreased and increased respectively.

52 Claims, 3 Drawing Sheets

U.S. PATENT DOCUMENTS

| | | | | |
|---|---|---|---|---|
| 2,640,235 | A | 6/1953 | Hazelett | |
| 2,978,761 | A | 4/1961 | Foye et al. | |
| 3,193,888 | A | 7/1965 | Rochester | |
| 3,279,000 | A | 10/1966 | Cofer et al. | |
| 3,426,836 | A | 2/1969 | Altenpohl et al. | |
| 3,747,666 | A | 7/1973 | Gyongyos | |
| 3,759,313 | A | 9/1973 | Gyongyos | |
| 4,331,195 | A | 5/1982 | Webber | 164/431 |
| 4,682,646 | A | 7/1987 | Hulek | 164/481 |
| 4,911,223 | A | 3/1990 | Sato et al. | 164/430 |

* cited by examiner

CONTINUOUS CHAIN CASTER AND METHOD

Matter enclosed in heavy brackets [ ] appears in the original patent but forms no part of this reissue specification; matter printed in italics indicates the additions made by reissue.

PRIORITY CLAIM

The current application claims priority from provisional application Ser. No. 60/006,689 filed Nov. 14, 1995.

BACKGROUND OF THE INVENTION

This invention relates to continuous casting apparatuses and methods.

Continuous casting of metals and metal alloys of various kinds, both ferrous and nonferrous, has been undertaken for many years. The majority of the prior art discloses machines in which casting is performed by discharging molten metal between a pair of rollers which are continually cooled. It is possible to cast vertically downward, downward at an angle, or horizontally.

Continuous casting of metals is undertaken by two common methods that are similar in some respects. Briefly, continuous casting is performed by means of endless members e.g. mold blocks mounted on or forming continuous chains, or endless belts with moving side dams disposed between the belts. The endless members which are typically disposed horizontally or slanted at a small angle from the horizontal serve as the mold for the cast metal, e.g., billet, slab, sheet, plate, or strip. The endless members, moving in non-circular paths, come together tangentially in a casting region to form a casting mold channel and stay together long enough so that the metal is solidified enough to support itself after which the endless members separate and are carried back to the beginning of the casting region. This method of casting has proved efficient and economical particularly in the casting of shapes such as slab, plate or strip, which may be used as the finished product, or if desired, the shape may be subjected to reduction rolling as it emerges from the horizontally disposed casting machine.

As stated, these generally horizontally disposed continuous casting machines are predominantly of two types. The first type utilizes a pair of continuous belts which approach each other tangentially to form a movable mold therebetween. As the molten metal is introduced between the belts, the belt is cooled. The cooling is, however, somewhat inefficient, and the thickness of the strip varies because of the lack of stiffness in the belt. To prevent variations in the thickness and shape of the strip, the molten metal must be supplied to the mold at a low pressure which effects the casting process and causes surface and shape problems as well as deficiencies in the metal structure.

To overcome the inefficiencies in cooling, thickness, and cast metal quality control, the belt is replaced with a continuous chain in the second type of caster which has consecutive mold blocks attached to or actually forming the chain. The mold blocks provide a structure which can be externally cooled, internally cooled, or both externally and internally cooled. This structure efficiently cools the metal being molded between the caster blocks, and the continuous caster utilizing the mold blocks also provides increased stiffness which results in a uniform thickness of the strip. This process is, however, subject to other deficiencies. Where the consecutive mold blocks abut each other, molten metal can flow in between the blocks and solidify there creating protrusions extending from the molded metal across its width. These protrusions are commonly referred to as fins. The presence of fins on the molded strip interferes with the subsequent formation processes, such as rolling, to which the molded metal might be subjected.

Further, it is frequently necessary, during the casting of flat products such as sheets or strips, to adjust the width of the strip. To adjust the width of the strip, different widths of chains must be kept in stock or continuous, expensive, adjustable width side dams which are movable across the width of the blocks must be provided. Because of the weight and bulk of the chain, the change is a difficult, time consuming, and extremely costly procedure.

It has also been difficult to obtain high accuracies of strip thickness/shape with the continuous casting machines. As the molten metal moves along the length of the chain caster, the metal cools and solidifies in the mold channel. As the metal cools, the volume decreases thus changing the casting pressure applied to the metal as it solidifies in the mold channel. The metal may even lose contact with the mold channel. This slows cooling thus requiring a longer mold channel, and under some circumstances, this can lead to undesirable variations in thickness and other shape deformations. More frequently, this has adverse effects on the microstructure of the cast product.

Thus, the production of continuous cast products without fins is desirable to enhance the products fabricated from continuous casting process and increase the ability to subject the continuously cast metal to further processing. It is also desirable to change the mold width of a continuous caster utilizing a chain without changing the chain. Further, it is desirable to maintain the casting pressure on the metal as it solidifies. The production of continuous cast products without fins, shortening the stop time of a width change, changing the mold width without changing the chain, and controlling the casting pressure, translate directly into increased use of continuously cast products and a reduction of manufacturing expenses for continuously cast products.

BRIEF SUMMARY OF THE INVENTION

There is, therefore, provided in the practice of this invention a novel continuous caster comprising a headbox and a mold channel defined between two endless chain assemblies. The headbox is positioned at an opening of the mold channel, and molten metal is fed through the headbox to the mold channel. Each chain of the two endless chain assemblies has a protrusion at an opposite side of the chains defining a width and depth of the mold channel. At least one of the endless chain assemblies is movable relative to the other chain assembly, so that the width of the mold channel can be adjusted.

In a preferred embodiment, both of the chain assemblies are movable with respect to each other, so that the metal being cast is maintained centrally in the chain caster when the width of the mold channel is adjusted. In the preferred embodiment, the caster further comprises two endless belt assemblies which correspond to the chain assemblies. Each belt assembly operates externally from the corresponding chain assembly to create a smooth mold channel which produces a casted product without fins. The belts can have the same width as the mold channel which requires the casting process to be stopped so that the belts can be changed and the width of the mold channel changed. The relatively light and easily removable belts can be changed in a substantially shorter period of time than the chains. The belts can also have a width greater than the width of the mold channel to adjust the width of the mold channel without changing the belt.

The invention is further directed to a novel continuous caster comprising first and second mold assemblies having first and second moving chains and belts moving in first and second closed chain and belt paths, respectively. The chain paths are internal relative to the belt paths and the corresponding belt and chain paths join over at least the part of their paths where the first and second paths pass in close proximity to define a mold channel. Because the belt operates externally from the chain, the smooth belt defines the surface of the mold channel and prevents finning. A headbox and tip are provided at the opening of the mold channel to supply molten metal to the mold channel.

In a preferred embodiment, the caster further comprises a tensioning mechanism attached to the belts whereby the belts are tightened and held tightly against the chain. The belts are preferably coated with a heat resistant material which acts as a mold release, non-wetting agent, and heat transfer moderator. Further, cooling systems are provided for each mold assembly. Each cooling system is associated with both the belt and chain of the respective mold assembly thereby reducing the amount of cooling required.

The invention is still further directed to a novel continuous caster comprising a plurality of mold assemblies. At least one of the mold assemblies comprises an endless chain having a plurality of mold blocks, an upstream drive pulley, and a downstream drag pulley. The drive pulley pushes the chain into the casting region and the drag pulley tends to prevent the chain from leaving the casting region. Thus, the chain is compressed in the casting region, and the mold blocks are pushed together so that there are no gaps between the mold blocks. Preferably two mold assemblies utilize this feature, and the drive coupled to the upstream pulley supplies at least 4 kW more power than the drag drive for a strip 1000 mm wide and 25 mm thick. The mold blocks in this embodiment preferably have interlocking tongue-in-groove features to prevent "roof tiling."

In another embodiment, the invention is directed to a continuous caster comprising a headbox, a tip, and two opposing mold assemblies defining a mold channel therebetween. The headbox is positioned at an opening of the mold channel and molten metal is fed to the mold channel through the headbox and tip. The molten metal flows through the length of the mold channel to an exit. A means for adjusting the depth of the mold channel along the length of the mold channel is provided so that a depth of the mold channel at the exit can be changed relative to a depth of the mold channel at the opening during operation of the caster. To allow the depth adjustment without stopping the casting operation, mold blocks of the mold assemblies define at least one slot located near an end of the block. A leg is slidably received in the slot, and a biasing member is interposed between a base of the slot and the leg to bias the leg against an opposing surface.

In a preferred embodiment, each mold assembly comprises mold blocks defining slots with legs slidably received in the slots, and biasing members interposed between the legs and the bases of the slots. In this arrangement the slots of each mold assembly are on the same side opposite the slots of the other mold assembly. The mold blocks are also provided with back up extensions adjacent to the slots and located outside the legs. The back up extensions engage the legs and support them against the outward pressure of the metal inside the mold channel.

The invention is still further directed to a novel method for changing the width of a cast product being cast in a continuous casting process on a chain caster having two mold assemblies forming a mold channel therebetween. An alloy is continuously melted and introduced into the mold channel with a headbox through a tip. The width of the cast product is adjusted by sliding at least one of the mold assemblies relative to the other in a direction substantially transverse to the direction of travel of the metal through the mold channel. In a preferred embodiment, the width of the mold channel is adjusted by sliding both mold assemblies equal distances relative to each other in opposite directions which are substantially transverse to the direction of travel of the metal alloy, so that the alloy remains centered in the chain caster. Further, belts are used to define at least a portion of the mold channel. If the width of the belts is the same as the mold channel, the casting operation must be temporarily stopped and the belts and tips changed in order to adjust the width of the cast product. If the width of the belt is greater than the mold channel, the width of the cast product may be adjusted by temporarily stopping the process and changing the tip only.

The invention is still further directed to a novel method for continuous casting of products without fins on a chain caster having two belt and chain assemblies forming a mold channel therebetween. The method comprises melting a metal alloy, and introducing the metal into the mold channel. Endless belts are translated through closed paths, and endless chains are translated through closed paths inside the belt paths. In a preferred embodiment, the method further comprises tensioning the belts to insure that the belts do not separate from the chains in the casting region.

Another novel method is provided according to the present invention for compensating for volumetric changes of a metal alloy to prevent undesirable deformation, abnormalities in the microstructure, and enhance cooling as the metal alloy shrinks from cooling during a continuous casting process on a chain caster having upper and lower mold assemblies defining a mold channel therebetween. The volumetric changes are compensated for by adjusting the depth of the mold channel throughout its length. This is accomplished by pressing a plurality of slidable upper and lower legs held in slots of the mold blocks against opposing mold blocks of the other assembly. The legs of the upper assembly are on opposite sides of the lower assembly. This is further accomplished by tilting one of the mold assemblies relative to the other to adjust the depth of the mold channel. Preferably, one of the mold assemblies is tilted relative to the other mold assembly to decrease the depth of the mold channel at the exit thereby compressing the resilient members near the exit of the chain caster.

BRIEF DESCRIPTION OF THE DRAWINGS

These and other features and advantages of the present invention will be appreciated as the same become better understood by reference to the following Detailed Description when considered in connection with the accompanying drawings wherein.

DETAILED DESCRIPTION

Figure 1:
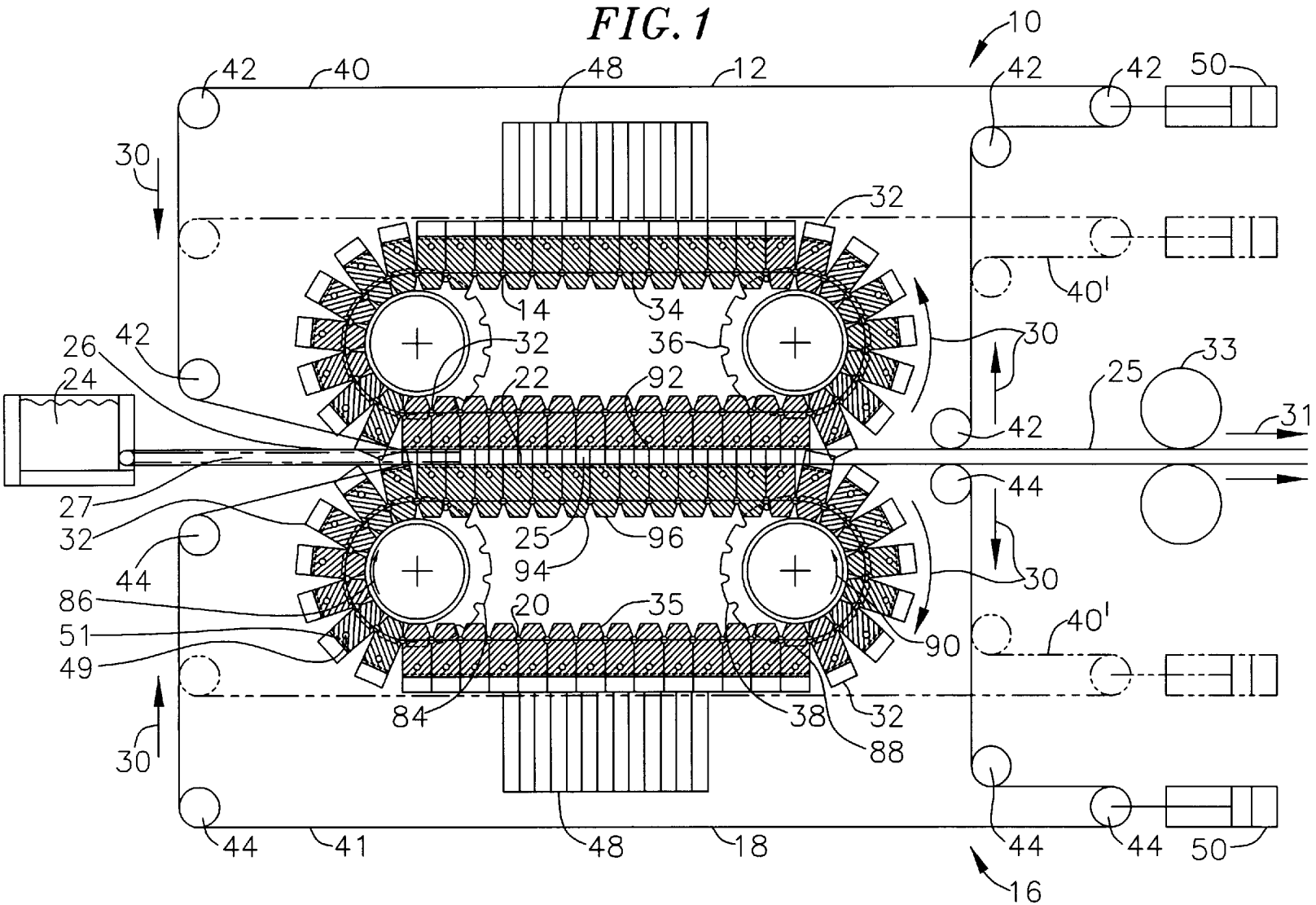
FIG. 1 is a side view of a continuous chain caster according to the present invention.

The continuous caster shown in FIG. 1 comprises an upper mold assembly, generally designated 10, which includes an upper endless belt 12 and an upper endless chain 14 which travel in upper closed belt and chain paths at synchronized speeds. The endless belt is formed from a strip of metal that is cut to length and welded end to end. Thus, the mold assembly for the preferred embodiment can also be referred to as an endless belt and chain assembly. A lower mold assembly, generally designated 16, includes a lower endless belt 18 and a lower endless chain 20 traveling in lower closed belt and chain paths. The two mold assemblies meet and move generally parallel to each other in the casting region to form a rectangular mold channel 22 in between the mold assemblies, and a headbox 24 is positioned at an opening 26 of the feed end of the continuous caster. The belts extend across the entire width of the mold channel. The headbox continuously introduces molten metal to the mold channel through a tip 27 and controls the pressure at which the metal is supplied to the mold channel. Because the belts and chains move in the direction of arrows 30, individual mold blocks 32 and the belts of the mold assemblies forming the mold channel move away from the headbox in the direction of arrow 31 carrying metal with them, and thus, the mold assemblies continuously introduce an empty mold channel to the tip. Molten metal from the headbox continuously fills the empty portion of the mold channel and thus, produces a continuous molded metal 25. As the metal passes through the mold channel, it is cooled and solidified, and the metal eventually exits the mold channel as a solid. The molded metal is preferable fed to a device 33, shown schematically, which pushes the molded metal toward the caster as it exits the mold channel to prevent strip shrinking and breakage, or the device 33 tensions the molded metal as it exits the caster. The molded metal may then be directed to other machines for further processing.

In the preferred embodiment shown, the upper and lower chains move around closed chain paths 34, 35 respectively defined by an upper set of chain pulleys (sprockets) 36 and a lower set of chain pulleys (sprockets) 38, and the upper and lower belts move in closed belt paths 40, 41 around a second set of upper belt pulleys 42 and a second set of lower belt pulleys 44. Over at least part of the paths, the chain and belt paths are joined. Where the belt and chain paths join, the chains guide and support the belts. As the two chains rotate around the pulleys, they are brought into close proximity to each other at the place where the belt and chain paths coincide to define the shape of the mold channel therebetween.

Because the belt path is the outer path relative to the chain and the inner paths relative to the mold channel, the belts define the inner, upper and lower surfaces of the mold channel, and the length of the casting region is the length of the mold channel less the length of the tip extending into the mold channel. Therefore, the molten metal introduced into the mold channel is formed into a strip or plate with an upper and lower surface defined by the belt, and the molten metal cannot flow into the cracks between the individual mold blocks that make up the chain. Thus, there are no fins on the molded metal 25, and the top and bottom surfaces of the molded metal, i.e. a strip or plate, are smooth. Consistent with this function, the steel belts are preferably coated with a heat resistant material which acts as a mold release, a non-wetting agent, and a heat transfer moderator. Further, the belts can be added to side dams to prevent finning along the edges of the molded metal.

The mold blocks are cooled by internal means, external means 48 such as a water to air heat exchanger (shown schematically), or both internal and external means. The internal means comprises supply holes 49 and return holes 51 which form a path for a fluid to flow through the mold block thereby cooling the mold block. Fluid manifolds, not shown, are connected to each mold block to connect the mold blocks to a fluid reservoir. The cooling of the mold blocks solidifies the metal inside the mold channel before it exits the caster. As shown in phantom lines, the belts can follow alternate belt paths 40' in which the belts are externally cooled by the same cooling mechanism 48 which externally cools the chain.

Because stiffness is provided by the chain in the present invention, the hydrostatic pressure in the headbox can be increased to increase the production rate of the continuous caster while still obtaining uniform thickness and a high quality molded metal. Utilizing the belt in addition to the chain, provides the advantage of a smooth surface without fins without sacrificing the advantages of using a chain. To ensure that the belt does not create variations in thickness, the belts are held in tension with a tensioning mechanism 50 (shown schematically).

Further, the belt protects the chain, drastically reducing chain block wear. Previously, it was necessary to periodically grind the chain blocks to maintain the desired finish on the molded metal. Eventually the blocks could not be ground any further and it was necessary to replace the extremely expensive chain. Now the far less expensive belt is replaced. Thus, the combined belt and chain caster provides a substantial cost savings by increasing chain life and reducing operating costs. Still further increases in metal quality occur because the belts cover the chain blocks. Specifically, the chain blocks are three dimensionally distorted when in contact with the heated metal, and the belts which cover the chains smooth or neutralize these small deformations in the chain blocks so that they do not lower the quality of the molded metal.

Figure 2:
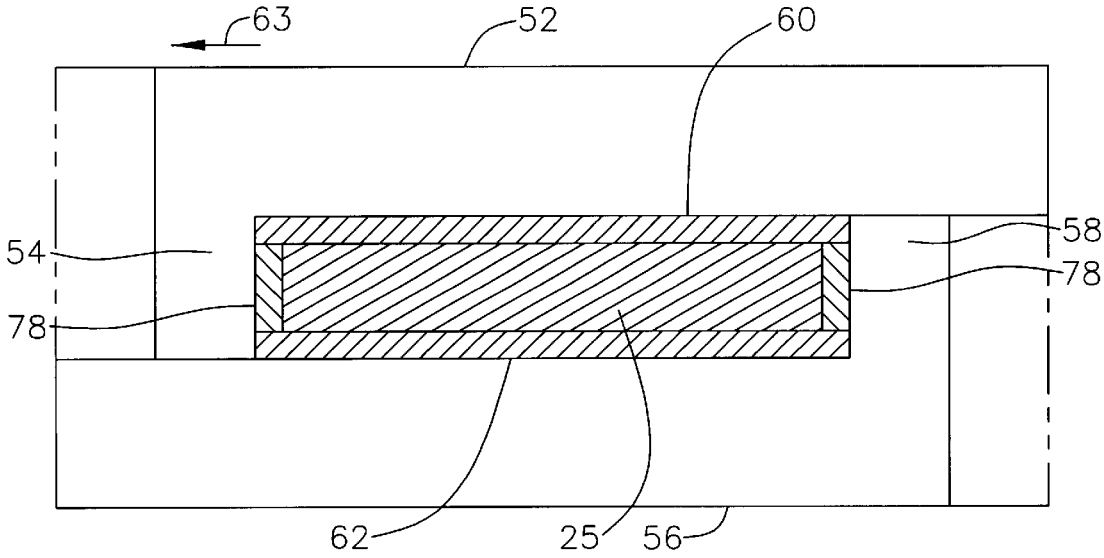
FIG. 2 is a cross section of a pair of opposing mold blocks and belts taken from inside the caster of FIG. 1.

Referring to FIG. 2, which is a cross section of the caster of FIG. 1 taken from inside the mold channel, each mold block is generally L-shaped. The upper mold block 52 has a vertical protrusion or side dam 54 with a flat and vertical inner wall extending toward the lower mold block 56, and the lower mold block has a vertical protrusion or side dam 58 with a flat and vertical inner wall extending toward the upper mold block to form the sides of the mold channel. The protrusions are positioned at a distance from the center of the chains toward the sides of the mold assemblies. The protrusions engage the opposing mold block. Though in the preferred embodiment shown, the protrusions are at opposite sides of the respective mold blocks, the protrusions can be located and spaced apart any where along the widths of the blocks. Because the protrusions engage the opposing mold block, the protrusions define the width of the mold channel. The belts 60, 62 are the same width as the mold channel, and as described above, the belts 60, 62 form the surfaces of the molded metal 25. To adjust the width of the molded metal in the embodiment of FIG. 2, the casting process must be stopped, and the belts and the tip must be changed. Belts having a width to suit the new width of the mold channel are placed onto the chains. To change the belts and tips, requires a short pause in the casting process. Because the belts are lighter and easier to handle than the chains, the time required to change the belts is much shorter than the time necessary to change the chains. After the belts are changed, at least one of the mold assemblies is slid relative to the other, as illustrated by arrow 63, to increase or decrease the width of the mold channel between the protrusions of the mold blocks. The direction in which the mold assemblies are slid is substantially transverse to the direction of travel of the metal alloy through the chain caster. That is, the assembly is moved perpendicular to the direction of travel of arrow 31 (FIG. 1). Because only the belts, and not the chains, are changed, there is a significant reduction in the time the caster is not operating due to the width change. Thus, replacing only the belts and tips substantially reduces the operating costs.

Figure 3:
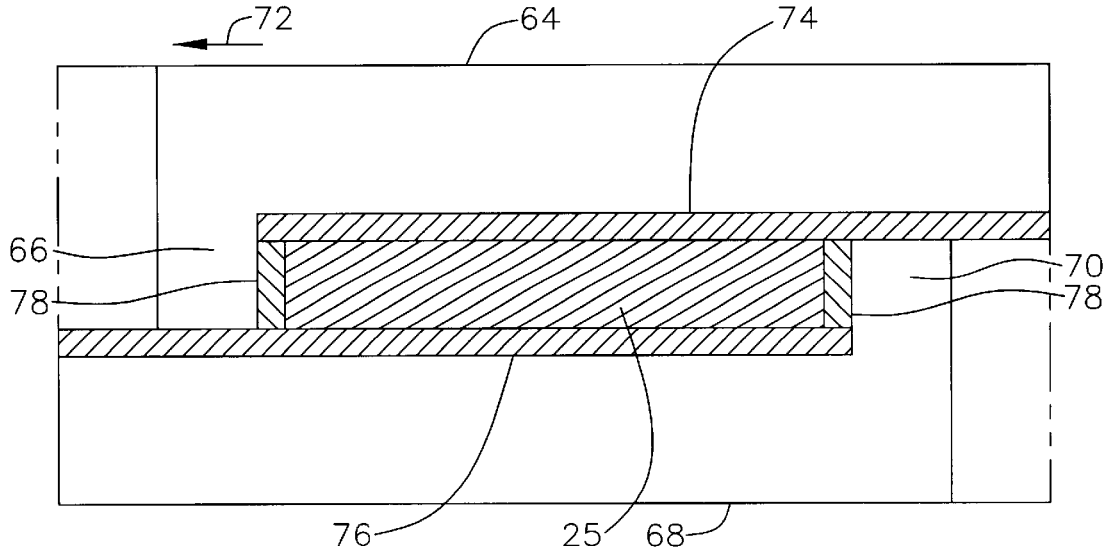
FIG. 3 is an alternate embodiment of the opposing mold blocks and belts of FIG. 2.

Utilizing the embodiment shown in FIG. 3 to change the width of the molded metal, allows width adjustments without changing the belts. Again, each mold block is generally L-shaped. The upper mold block 64 has a protrusion 66 extending toward the lower mold block 68, and the lower mold block has a protrusion 70 extending toward the upper mold block. In this embodiment, the belts 74, 76 extend beyond the mold channel, so that the protrusions 66, 70 actually engage the belts instead of the opposing mold blocks. Therefore, stopping the casting process only to change the tip, one of the mold assemblies can be slid relative to the other as illustrated by arrow 72 to adjust the width of the molded metal. This embodiment is thus capable of adjusting the width of the mold channel without changing the belts.

In both the preferred embodiments of FIGS. 2 and 3 the width can be adjusted by moving either one of the mold assemblies or both. It is preferred that both of the mold assemblies be moved an equal distance. When the width is adjusted by moving both the mold assemblies, the molded metal stays centered in the caster. It is important that the molded metal stay centered if it is fed to other equipment for further processing. If both the mold assemblies are moved, they are moved in opposite directions transverse, preferably perpendicular to the direction of the metal alloy moving through the caster. It may also be preferred in some applications to have another set of belts which would cover the inner sides 78 of the protrusions to prevent finning on the edges of the cast product. These methods and apparatuses provide simple and cost effective means for width adjustment and allow use of spring mounted side dams to be discussed below.

When casting widths with the preferred embodiment of the caster shown in FIG. 3, the width of the belts are frequently larger than the width of the molded metal. When this occurs, as shown in FIG. 3, the entire widths of the belts are not in contact with the molten metal. This can result in thermal distortions in the belt. Any thermal distortions which occur can lead to variations in the thickness of the molded metal caused by ripples in the belts. To address this problem, the belt is preferably manufactured from a low thermal expansion material such as a high nickel alloy, stainless steel, or INVAR®. Further, the portions of the belts not exposed to the hot metal can be heated to prevent thermal distortion.

Referring again to FIG. 1, as an alternative to or in conjunction with using belts in combination with chains to prevent finning, the chains can be pushed through the chain path in the casting region rather than pulled through the chain path. Each of the upper 36 and lower 38 sets of chain pulleys (sprockets) is rotationally manipulated so that the chain is compressed in the casting region. Discussing the lower assembly to describe this arrangement, the upstream drive pulley 84 is rotated by a drive mechanism (not shown) in the direction of arrow 86, so that the chain is pushed into the casting region. Preferably the down stream drag pulley 88 has a drag generator to hinder (brake) rotation. Braking the down stream pulley imparts a rotational force to the chain in the direction of arrow 90. This tends to prevent the chain from exiting the casting region. Thus, the chain is compressed and the mold blocks are pushed together in the casting region between the upstream and downstream pulleys. In this embodiment, a gap that could allow metal to flow therein and create a fin, which would normally occur at the intersection 92 between two adjacent mold blocks 94, 96, is forced closed by the compression force created between the driven upstream pulley and the braked downstream drag pulley.

The drive coupled to the upstream pulley is more powerful than the drag drive. For example, a 1000 mm wide 25 mm thick strip requires approximately 4 kW to convey the metal through the caster. Thus, a 2 kW drag drive on the downstream pulley would require a 6 kW drive on the upstream pulley. In another example, a single 5.5 kW drive is used to drive the upstream pulley for both chains and a single 1.1 kW drag drive is used on each downstream pulley. This allows independent adjustment of the drag drives for each chain.

Figure 6:
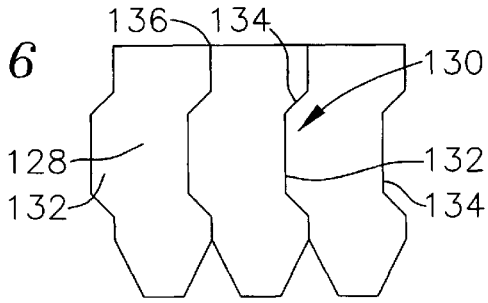
FIG. 6 is a side view of mold blocks having interlocking mechanisms therebetween.

When a compressive forces is applied to the chain, it is preferred that adjacent mold blocks are interlocked by a tapered key way, generally designated 130, and shown in FIG. 6. Each mold block 128 has a tongue 132 on one side which is preferably trapezoidal in shape and a groove 134 on the opposite side which is also trapezoidal in shape. The tongue and groove interlock with a corresponding groove and corresponding tongue, respectively, formed on adjacent blocks. The tapered trapezoidal shapes allow the tongue-in-groove arrangement to interlock as the blocks are translated into the mold channel. Interlocking the mold blocks prevents a problem best described as "roof tiling." Roof tiling occurs when the mold blocks slant in the mold channel, so that the adjacent mold edges of the mold blocks do not align. Thus, a means for interlocking the mold blocks it provided to assure mold block edge 136 alignment as shown in FIG. 6.

Figure 4:
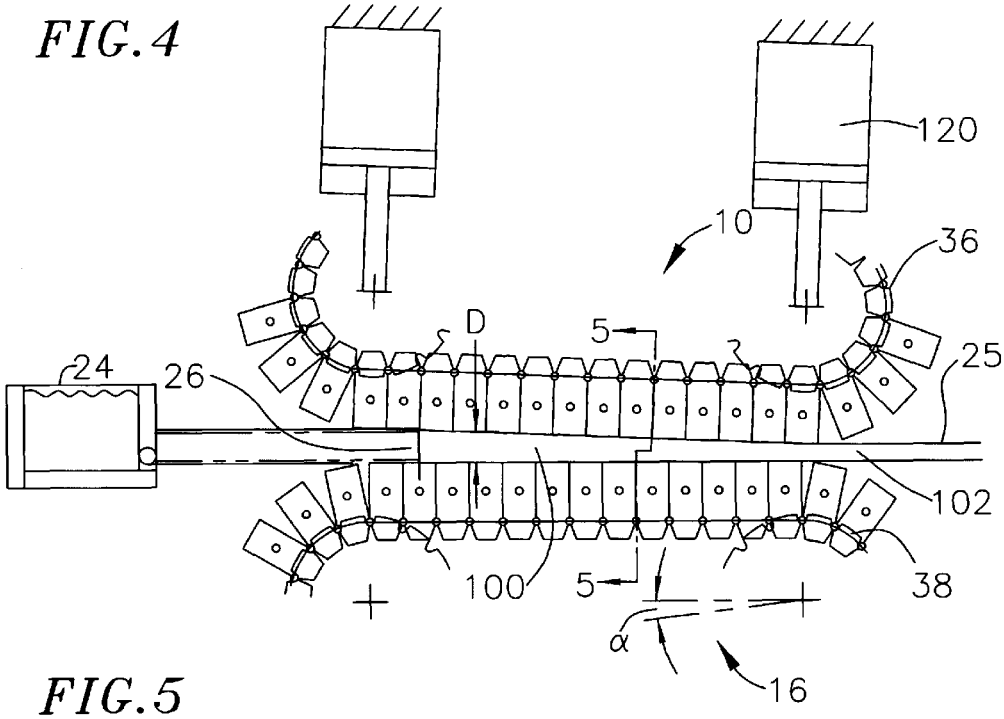
FIG. 4 is a partial side view of an inclined continuous chain caster having a mold channel decreasing in depth toward the exit of the chain caster.

Referring to the preferred embodiment shown in FIG. 4, the mold channel 100 of the chain caster has a depth "D" which changes along the length of the caster. The depth or thickness of the mold channel, more commonly referred to as gauge, is adjusted along the length of the caster by tilting one or both of the mold assemblies 10,16 relative to the other, so that the planes of the upper and lower belts or chains would eventually intersect if extended beyond the mold channel away from the exit end of the machine. Thus, the chains converge toward the exit of the caster. This adjustable relationship between the assemblies is obtained by a means for adjusting the depth of the mold channel comprising a hydraulic, electromechanical, or manually adjustable control mechanism, not shown, which raises or lowers one of the pulleys of an assembly relative to the other pulley of the same assembly thereby changing the angle of the assembly with respect to a stationary reference point and with respect to the other assembly. The manual adjustment comprises a rotating adjustment screw. Preferably, the adjustment results in an opening depth 26 greater than the exit depth 102 of the mold channel. Thus, the depth of the mold channel decreases as the metal moves closer to the exit of the mold channel.

This arrangement provides control of the casting pressure through out the mold channel as the metal decreases in volume due to cooling. As the metal cools and the volume decreases, the depth of the mold channel also decreases to maintain the casting pressure on the metal and prevent abnormalities in microstructure, undesired deformations, and enhance cooling by maintaining contact between the metal and the belts or chains. Thus, the tolerances obtainable by the continuous casting process are increased, and the caster does not need to be as long. The ability to control and maintain uniform casting pressures along the length of the chain is achieved by two features. 1) As stated, by tilting the upper chain relative to the lower, and 2) by applying a constant force, using an air cylinder 120, spring, or other force application means, to the upper chain supports which would tend to "squeeze" the chains together. This could be a passive (preset) adjustment, or it could be a continually adjustable (active control) setting which would change as process variables change.

It is also desired for some applications to cast at an angle downward. To that end the mold channel is given an angle a with the horizontal. The angle $\alpha$ can range from zero to ninety degrees but is preferably between five and fifteen degrees. Generally, the thinner the cast metal, the larger the angle $\alpha$.

Figure 5:
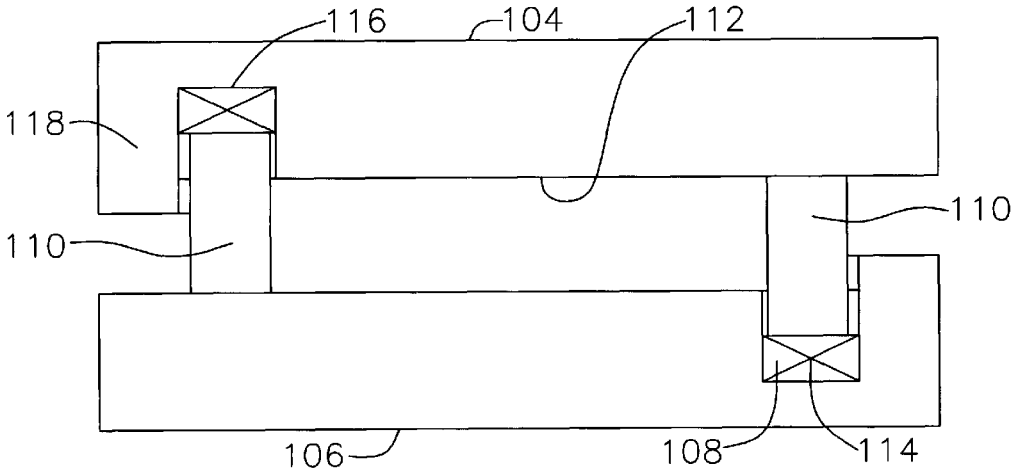
FIG. 5 is an end view of a pair of opposing mold blocks taken along line 5—5 of the chain caster in FIG. 4.

When the width adjustment feature of the present invention is utilized with the gauge adjustment feature just discussed, the preferred embodiment of the chain assembly shown in FIG. 5 is utilized. An upper block 104 and lower block 106 are similarly constructed, and the net shape of each block is substantially an L-shape. Near the opposite sides of the upper and lower blocks there are slots 108 which slidably receive retractable legs or side dams 110 which are pressed against the opposing surfaces 112 of the opposite blocks by schematically shown biasing members 114 which are interposed between the bases 116 of the slots and the legs. The slots of each mold assembly are on the same side opposite the slots of the other mold assembly. Each biasing member is preferably a resilient member such as a hydraulic/air cylinder or spring. Each leg is movable within the slot and is biased by the resilient member against the opposing surface of the mold block or belt so that when the chain assemblies are tilted relative to each other and clamped together, the resilient member pushes the leg farther out or allows the leg to retract inwardly depending on the adjustment performed. Specifically, the legs retract when the depth is reduced and the legs extend farther out when the depth is increased.

The blocks also have a backup extensions 118 positioned adjacent to the slots and outwardly from the legs. The extensions engage the legs to prevent them from becoming skewed in the slots from the outward force of the metal, and therefore, the extensions maintain the shape of the edge of the metal as it solidifies. The width adjustment feature functions similar to the embodiment described above. If the width adjustment feature is not required, the two legs could be positioned in the same block at opposite sides. This embodiment also preferably utilizes belts as shown in FIGS. 2 or 3. Further, conventional mechanisms are provided to prevent the resilient member from ejecting the legs from the slot when they are not forced against an opposing mold block.

Thus, a continuous caster is disclosed which utilizes endless belt and chain assemblies with width and gauge adjustment which move relative to each other to more efficiently obtain the desired molded metal at a reduced cost. Further, chains of the chain assembly are compressed in the casting region, and the chains have interlocking mold blocks. Though some of the features of the invention are claimed in dependency, each has merit if used independently. While embodiments and applications of this invention have been shown and described, it would be apparent to those skilled in the art that many more modifications are possible without departing from the inventive concepts herein. For example, these concepts could be applied to a vertical caster. It is, therefore, to be understood that within the scope of the appended claims, this invention may be practiced otherwise than as specifically described.

What is claimed is:

[1. A continuous caster comprising:

a headbox;

a tip;

a mold channel having a depth defined between two endless chain assemblies each having a chain;

the headbox and tip being positioned at an opening to the mold channel to supply molten metal from the headbox to the mold channel;

each chain having a protrusion at an opposite side of the chains defining a width of the mold channel therebetween;

a means for adjusting the depth of the mold channel along the length of the mold channel so that an exit depth of the mold channel is less than an opening depth of the mold channel; and at least one of the endless chain assemblies being moveable relative to the other to adjust the width of the mold channel.]

[2. The caster according to claim 1 further comprising two endless belt assemblies each corresponding to one of the chain assemblies and wherein each belt assembly has a belt which operates externally of the corresponding chain assembly to create a smooth mold channel which produces a cast product without fins.]

[3. The caster according to claim 2 wherein the belts have widths equal to the width of the mold channel.]

[4. The caster according to claim 2 wherein the belts have widths greater than the width of the mold channel to adjust the width of the mold channel without changing the belts.]

[5. The caster according to claim 2 further comprising a tensioning mechanism attached to the belt to tighten and hold the belt against the chain.]

[6. The caster according to claim 2 further comprising a coating of a heat resistant material on the belts acting as a mold release, non-wetting agent, and heat transfer moderator.]

[7. The caster according to claim 2 further comprising a first external means for cooling associated with one of the belts and one of the chains, and a second external means for cooling associated with the other belt and the other chain.]

[8. The caster according to claim 1 wherein the chain assemblies are moveable with respect to each other to adjust the width of the mold channel and to maintain the molten metal centrally in the chain caster.]

[9. The caster according to claim 1 wherein the mold channel extends over a length between an opening and an exit, and the caster further comprises:

at least one of the chain assemblies comprises a plurality of mold blocks; and each mold block comprises at least one slot positioned near an end of the block, at least one leg slidably received in the slot defining sides of the mold channel, and at least one biasing member interposed between a base of the slot and the leg to bias the leg against an opposing surface to maintain the sides of the mold channel during a depth adjustment.]

[10. The caster according to claim 9 wherein both chain assemblies comprise mold blocks, and the slots of each mold block of one of the chain assemblies are on the same side opposite the slots of the mold blocks of the other chain assembly.]

[11. The caster according to claim 9 wherein each mold block comprises a backup extension located adjacent the slot and outwardly from the leg, and the extension engaging the leg to support it.]

[12. The caster according to claim 1 wherein the depth is adjusted so that the chains converge toward an exit of the mold channel.]

13. [The caster according to claim 1] *A continuous caster comprising:*

*a headbox;*

*a tip;*

*a mold channel having a depth defined between two endless chain assemblies each having a chain;*

*the headbox and tip being positioned at an opening to the mold channel to supply molten metal from the headbox to the mold channel;*

*each chain having a protrusion at an opposite side of the chains defining a width of the mold channel therebetween;*

*a means for adjusting the depth of the mold channel along the length of the mold channel so that an exit depth of the mold channel is less than an opening depth of the mold channel; and*

*at least one of the endless chain assemblies being moveable relative to the other to adjust the width of the mold channel;* wherein at least one of the chain assemblies comprises an endless chain having a plurality of mold blocks, an upstream drive pulley pushing the chain into a casting region of the carts, and a downstream drag pulley *having a drag generator* hindering rotation to compress the chain in the casting region and push the mold blocks together to reduce finning.

14. The caster according to claim 13 further comprising an upstream drive coupled to the upstream drive pulley and a drag drive coupled to the downstream drag pulley, and wherein the upstream drive is more powerful than the drag drive.

15. The caster according to claim 14 wherein the upstream drive is 6 kW and the drag drive is 2 kW.

16. The caster according to claim 13 wherein the mold blocks comprise interlocking mold blocks.

[17. A method for continuous casting of a cast product having a width and a depth on a chain caster having two mold assemblies with chains forming a mold channel, the method comprising:

continuously melting a metal alloy;

continuously introducing the molten metal alloy into the mold channel with a headbox and a tip;

moving at least one of the mold assemblies relative to the other in a direction substantially transverse to a direction of travel of the metal alloy through the mold channel to adjust any one of the width and depth of the cast product; and converging one mold assembly relative to the other mold assembly in a direction of travel of the metal alloy through the mold channel to compensate for metal shrinkage and casting pressure regulation along the length and width of the mold channel.]

[18. The method according to claim 17 further comprising sliding at least one of the mold assemblies relative to the other to adjust the width of the cast product.]

[19. The method according to claim 17 further comprising sliding both mold assemblies equal distances relative to each other in opposite directions substantially transverse to the direction of travel of the metal alloy to adjust the width of the cast product.]

[20. The method according to claim 17, wherein the mold assemblies have a belt, further comprising changing the belt on the mold assemblies.]

[21. The method according to claim 17, wherein the mold assemblies have an endless belt, further comprising:

translating the endless belt of the assemblies through a closed belt path covering the entire width of the mold channel; and translating the chains of the assemblies through a closed chain path inside the closed belt path.]

[22. The method according to claim 21 wherein each belt defines a portion of the mold channel and has a width greater than a width of the mold channel, the method further comprising heating portions of each belt not in contact with the metal alloy.]

[23. The method according to claim 21 further comprising tensioning each belt.]

[24. The method according to claim 17 further comprising:

tilting at least one mold assembly relative to the other; and converging the mold assemblies toward the exit of the mold channel.]

[25. The method according to claim 17 wherein the chains comprise mold blocks, the method further comprising:

pressing a plurality of slidable upper legs held in slots of the mold blocks of one of the mold assemblies against opposing mold blocks of the other mold assembly with resilient members;

pressing a plurality of slidable lower legs held in slots of the mold blocks of the other mold assembly against opposing mold blocks of the one mold assembly with resilient members and at an opposite side of the one mold assembly from the upper legs; and tilting one of the mold assemblies relative to the other to adjust the depth of the mold channel.]

[26. The method according to claim 25 wherein tilting one of the mold assemblies comprises tilting one of the mold assemblies to decrease the depth of the mold channel at an exit of the mold channel and compressing the resilient members near the exit of the mold channel.]

27. [The method according to claim 17 further comprising:] *A method for continuous casting of a cast product having a width and a depth on a chain caster having two mold assemblies with chains forming a mold channel the method comprising:*

*continuously melting a metal alloy;*

*continuously introducing the molten metal alloy into the mold channel with a headbox and a tip;*

*moving at least one of the mold assemblies relative to the other in a direction substantially transverse to a direction of travel of the metal alloy through the mold channel to adjust any one of the width and depth of the cast product;*

*converging one mold assembly relative to the other mold assembly in a direction of travel of the metal alloy through the mold channel to compensate for metal shrinkage and casting pressure regulation along the length and width of the mold channel;* rotating upstream pulleys with a drive in directions such that the upstream pulleys are pushing the chains into a casting region of the chain caster; and hindering rotation of downstream pulleys with a drag generator such that the upstream pulleys and the downstream pulleys are pressing a plurality of mold blocks connected to the chains together in the casting region.

28. The method according to claim [17] *27* further comprising compressing the chains in the casting region so that there are no gaps between the mold blocks of the chains.

29. A continuous caster comprising:

a headbox;

a tip;

a mold channel defined between two endless chain assemblies each having a chain;

the headbox and tip being positioned at an opening to the mold channel to supply molten metal from the headbox through the tip to the mold channel;

each chain having a protrusion at an opposite side of the chains defining a width of the mold channel therebetween;

at least one of the endless chain assemblies comprises a plurality of mold blocks being moveable relative to the other to adjust the width of the mold channel*, an upstream drive pulley pushing the chain in the mold channel and a downstream drag pulley having a drag generator hindering rotation to compress the chain in the mold channel and push the mold blocks together to reduce finning*; and each mold block comprises at least one slot positioned near an end of the block, at least one leg slidably received in the slot defining sides of the mold channel, and at least one biasing member interposed between a base of the slot and the leg to bias the leg against an opposing surface to maintain the sides of the mold channel during a depth adjustment.

30. A method for compensating for volumetric changes of a metal alloy to prevent undesirable deformation as the metal alloy cools during a continuous casting process on a chain caster having upper and lower mold assemblies forming a mold channel extending over a length and having a depth, exit, and opening, the method comprising:

pressing a plurality of slidable upper legs held in slots of [the] mold blocks of the upper mold assembly against opposing mold blocks of the lower mold assembly with resilient members;

pressing a plurality of slidable lower legs held in slots of the mold blocks of the lower mold assembly against opposing mold blocks of the upper mold assembly with resilient members and at an opposite side of the upper mold assembly from the upper legs; [and]

tilting one of the mold assemblies relative to the other to adjust the depth of the mold channel*;*

*rotating upstream pulleys with a drive in directions such that the upstream pulleys are pushing the mold assemblies into a casting region of the chain caster; and*

*hindering rotation of downstream pulleys with a drag generator such that the upstream pulleys and the downstream pulleys are pressing a plurality of the mold blocks connected to the mold assemblies together in the casting region.*

31. A continuous chain caster having a casting region, the caster including:

a plurality of mold assemblies forming a mold channel therebetween; and at least one mold assembly comprising an endless chain having a plurality of interlocking mold blocks, an upstream drive pulley pushing the chain into the casting region, and a downstream drag pulley *having a drag generator* hindering rotation to compress the chain in the casting region and push the mold blocks together to reduce finning.

32. A method for continuous casting of products on a chain caster having a casting region and two chain assemblies each having an upstream pulley and a downstream pulley to drive a chain comprised of a plurality of interlocking mold blocks and the chain assemblies forming a mold channel therebetween, the method comprising:

rotating the upstream pulleys with a drive in directions such that the pulleys are pushing the chains into the casting region; and hindering rotation of the downstream pulley with a drag generator such that the upstream pulleys and downstream pulleys are pressing the mold blocks together in the casting region.

*33. A continuous non-vertical caster for casting a non-ferrous metal or an alloy thereof to a predetermined width and depth comprising:*

*a headbox;*

*a tip;*

*two opposed endless mold assemblies that can each travel along a closed path and that cooperate to define a mold channel between them; the mold channel having a feed opening and an exit and a casting region therebetween, and the metal or alloy, in a molten state, being able to move in the mold channel in a direction of travel between the feed opening and the exit; the mold channel having a depth that is defined between the two opposed mold assemblies; at least one of the mold assemblies having a plurality of mold blocks; the headbox and tip being positioned at the feed opening to supply the metal or alloy, in the molten state, from the headbox through the tip into the mold channel;*

*a side dam on an opposite side of each mold assembly defining respective sides and a width of the mold channel between the side dams;*

*adjusting means for changing the position of one of the endless mold assemblies relative to the other in at least one of two orthogonal directions transverse to the direction of travel to adjust any one of the width and the depth of the mold channel and thereby to adjust any one of the width and the depth of the metal or alloy in the molten state moving through the mold channel; and*

*internal cooling means in the mold blocks to cool the mold blocks to solidify the metal or alloy in the mold channel;*

*wherein at least one of the mold assemblies further comprises an upstream drive pulley pushing the mold blocks into the casting region and a downstream drag pulley having a drag generator hindering rotation to compress the mold assembly in the casting region and push the mold blocks together to reduce finning.*

*34. The caster of claim 33 wherein external cooling means also cool the mold blocks to solidify the metal or alloy in the mold channel.*

*35. The caster of claim 33 comprising first adjusting means for changing the position of one of the endless mold assemblies relative to the other in a first of the two orthogonal directions to adjust the width of the mold channel.*

*36. The caster of claim 35, wherein both mold assemblies are supported for movement at an equal distance in opposite directions with respect to each other when adjusting the width of the mold channel so as to enable the metal to be maintained centrally in the caster.*

*37. The caster of claim 35, further comprising second adjusting means for changing the position of one of the*

*endless mold assemblies relative to the other in a second of the two orthogonal directions to adjust the depth of the mold channel.*

*38. The caster of claim 37, wherein the second adjusting means can change the depth of the mold channel lengthwise of the mold channel so that the depth of the mold channel at the exit is less than the depth of the mold channel at the feed opening thereby providing a convergence of the mold toward the exit.*

*39. The caster of claim 38 wherein the second adjusting means can change the depth of the mold channel to maintain the convergence of the mold assemblies.*

*40. The caster of claim 37 wherein when the second adjusting means changes the position of one of the assemblies in said second of the two orthogonal directions the extent to which each side can dam extends from its mold assembly is adjusted automatically.*

*41. The caster of claim 40 wherein the side dam from each mold assembly in defining the depth of the mold channel extends only to the other mold assembly.*

*42. The caster of claim 40 wherein each mold block comprises at least one slot positioned near a side of the block, at least one side dam slidably received in the slot and defining a side of the mold channel and at least one biasing member interposed between a base of the slot and the side dam to bias the side dam against an opposing surface to maintain the side of the mold channel during any one of a width and a depth adjustment.*

*43. The caster of claim 42 wherein the slots of the mold blocks of one of the mold assemblies are on the same side but are on the opposite side from the slots of the mold blocks of the other mold assembly.*

*44. The caster of claim 43 wherein each mold block comprises a backup extension located adjacent the slot and outwardly from the side dam and the extension engages the side dam to support it.*

*45. The caster of claim 43 wherein the side dam from each mold assembly in defining the depth of the mold channel extends only to the other mold assembly.*

*46. The caster of claim 45 wherein a first one of the endless mold assemblies can travel along a first closed path, a second one of the mold assemblies can travel along a second closed path wherein the second closed path at least in part extends in close proximity to the first closed path and wherein the first one of the mold assemblies and the second one of the mold assemblies each have a substantially flat surface to form a rectangular mold channel between them.*

*47. The caster of claim 42 wherein a first one of the endless mold assemblies can travel along a first closed path, a second one of the mold assemblies can travel along a second closed path wherein the second closed path at least in part extends in close proximity to the first closed path and wherein the first one of the mold assemblies and the second one of the mold assemblies each have a substantially flat surface to form a rectangular mold channel between them.*

*48. The caster of claim 47 yet further comprising two endless belts each traveling around and parallel to one of the mold assemblies and each traveling between the two mold assemblies to provide between the endless belts a smooth mold channel which can produce a cast product without fins in the regions contacted by the belts.*

*49. The caster of claim 48 still further comprising external cooling means to cool both the mold blocks and the endless belts to solidify the metal or alloy in the mold channel.*

*50. The caster of claim 49 wherein the external cooling means to cool both the mold blocks and the endless belts are the same external cooling means.*

*51. The caster of claim 49 wherein the endless belts have widths greater than the width of the mold channel so that the width of the mold channel can be adjusted without changing the belts.*

*52. The caster of claim 46 yet further comprising two endless belts each traveling around and parallel to one of the mold assemblies and each traveling between the two mold assemblies to provide between the endless belts a smooth mold channel which can produce a cast product without fins in the regions contacted by the belts.*

*53. The caster of claim 52 still further comprising external cooling means to cool both the mold blocks and the endless belts to solidify the metal or alloy in the mold channel.*

*54. The caster of claim 53 wherein the external cooling means to cool both the mold blocks and the endless belts are the same external cooling means.*

*55. The caster of claim 54 wherein the endless belts have widths greater than the width of the mold channel so that the width of the mold channel can be adjusted without changing the belts.*

*56. A method for continuous non-vertical casting of a non-ferrous metal or an alloy thereof to a predetermined width and depth wherein two opposed endless mold assemblies each having a plurality of mold blocks and traveling along a closed path cooperate to define a mold channel between them; the mold channel having a feed opening and an exit and a casting region therebetween and the metal or alloy in a molten state being able to move in the mold channel in a direction of travel between the feed opening and the exit;*

*the method comprising the steps of:*

*melting the metal or alloy;*

*introducing the metal or alloy in a molten state into the feed opening;*

*translating the mold assemblies along closed paths along the direction of travel between them;*

*cooling the mold blocks internally to solidify the metal or alloy in the mold channel;*

*moving the mold assemblies relative to one another in one of two orthogonal directions substantially transverse to the direction of travel to adjust any one of the width and the depth of the mold channel and thereby to adjust any one of the width and the depth of the metal or alloy in the molten state moving through the mold channel;*

*rotating upstream pulleys with a drive and direction such that the upstream pulleys are pushing at least one of the mold assemblies into a casting region; and*

*hindering rotation of downstream pulleys with a drag generator such that the upstream pulleys and the downstream pulleys are pressing a plurality of mold blocks together in the casting region.*

*57. The caster of claim 56 wherein external cooling means also cool the mold blocks to solidify the metal or alloy in the mold channel.*

*58. The method of claim 56 further comprising a step of adjusting the width of the mold channel by sliding at least one of the mold assemblies to move it relative to the other in the direction transverse to the direction of travel of the metal or alloy.*

*59. The method of claim 58 further comprising a step of adjusting the width of the mold channel by sliding each of the mold assemblies an equal distance in opposite directions transverse to the direction of travel whereby the metal or alloy remains centered in the caster.*

*60. The method of claim 59 further comprising the step of tilting the mold assemblies relative to one another so that*

*they converge in the direction of travel to compensate for metal shrinkage and provide casting pressure regulation along the length and width of the mold channel in the direction of travel.*

*61. The method of claim 60 wherein each mold assembly extends as far as the other mold assembly transverse to the direction of travel and includes a projecting side dam defining a side of the mold channel; and wherein the side dam of each mold assembly during the step of tilting the mold assemblies relative to one another extends towards and is pressed against the other mold assembly.*

*62. The method of claim 60 wherein each side dam of one of the mold assemblies is pressed against the other mold assembly by a resilient member between the side dam and the one mold assembly.*

*63. The method of claim 56 further comprising the steps of:*

*pressing a plurality of slidable upper side dams held in slots of the mold blocks of an upper one of the mold assemblies against the mold blocks of a lower one of the mold assemblies with resilient members between the upper side dams and the mold blocks of the upper mold assembly;*

*pressing a plurality of slidable lower side dams held in slots of the mold blocks of the lower mold assembly against the mold blocks of the upper mold assembly with resilient members between the lower side dams and the mold blocks of the lower mold assembly; the lower and upper side dams being on opposite sides of the mold channel; and*

*tilting the mold assemblies relative to one another to adjust the depth of the mold channel along the direction of travel.*

*64. The method of claim 63 wherein the step of tilting the mold assemblies relative to one another decreases the depth of the mold channel at the exit of the mold channel and compresses the resilient members near the exit.*

*65. The method of claim 56 further comprising the step of translating opposed endless belts through closed belt paths along the direction of travel and over the width of the mold channel; the closed path of each mold assembly being within the closed belt path of one of the endless belts.*

*66. The method of claim 65 wherein external cooling means cool both the mold blocks and the endless belts to solidify the metal or alloy in the mold channel.*

*67. The method of claim 66 wherein the same external cooling means cool both the mold blocks and the endless belts.*

*68. The method of claim 65 wherein a step of adjusting the width of the mold channel includes a step of changing the width of the opposed endless belts.*

*69. The caster of claim 13 wherein the caster is a non-vertical caster.*

*70. The method of claim 27 wherein the chain caster is a non-vertical chain caster.*

*71. The caster of claim 29 where in the caster is a non-vertical caster.*

*72. The method of claim 30 wherein the chain caster is a non-vertical chain caster.*

*73. The method of claim 27 wherein the case product is a non-ferrous metal or alloy.*

*74. The method of claim 30 wherein the metal alloy is non-ferrous.*

* * * * *